(12) United States Patent
Cavina

(10) Patent No.: US 9,073,705 B2
(45) Date of Patent: Jul. 7, 2015

(54) DEVICE AND METHOD FOR REMOVING AND REPLACING CONTAINERS FROM A CONVEYOR LINE

(71) Applicant: I.M.A INDUSTRIA MACCHINE AUTOMATICHE S.p.A., Ozzano Emilia (Bologna) (IT)

(72) Inventor: Luigi Cavina, Bologna (IT)

(73) Assignee: I.M.A. INDUSTRIA MACCHINE AUTOMATICHE S.p.A., Ozzano Emilia (Bologna) (IT)

( * ) Notice: Subject to any disclaimer, the term of this patent is extended or adjusted under 35 U.S.C. 154(b) by 0 days.

(21) Appl. No.: 14/345,793

(22) PCT Filed: Sep. 21, 2012

(86) PCT No.: PCT/IB2012/055036
§ 371 (c)(1),
(2) Date: Mar. 19, 2014

(87) PCT Pub. No.: WO2013/046106
PCT Pub. Date: Apr. 4, 2013

(65) Prior Publication Data
US 2014/0238820 A1     Aug. 28, 2014

(30) Foreign Application Priority Data

Sep. 27, 2011 (IT) .............................. BO2011A0552

(51) Int. Cl.
*B65G 47/84* (2006.01)
*B67C 3/24* (2006.01)

(52) U.S. Cl.
CPC .............. *B65G 47/848* (2013.01); *B65G 47/84* (2013.01); *B67C 3/24* (2013.01); *B65G 47/846* (2013.01)

(58) Field of Classification Search
CPC .... B65G 47/84; B65G 47/846; B65G 47/848; B67C 3/24
USPC ........ 198/346.2, 478.1, 636, 598, 367, 471.1, 198/470.1, 384
See application file for complete search history.

(56) References Cited

U.S. PATENT DOCUMENTS

| 3,160,277 A | * | 12/1964 | Rotramel et al. ............. 209/523 |
| 3,351,198 A | | 11/1967 | Wyman |
| 4,125,184 A | | 11/1978 | Seragnoli |
| 4,469,217 A | * | 9/1984 | Meyer et al. ................ 198/419.2 |

(Continued)

FOREIGN PATENT DOCUMENTS

| DE | 1548285 A1 | 7/1969 |
| DE | 102008051919 A1 | 4/2010 |

*Primary Examiner* — Leslie A Nicholson, III
(74) *Attorney, Agent, or Firm* — R. Neil Sudol; Henry D. Coleman

(57) ABSTRACT

A device for removing and replacing containers from and on a conveyor line includes a first lateral guide wall; a second lateral guide wall; and a rotating disc provided with at least a seating The rotating disc is arranged between the first lateral guide wall and the second lateral guide wall for removing a container to be treated from the conveyor line and for replacing a treated container on the conveyor line The device further includes a first guide member mobile between a first retracted position and a first advanced position and a second guide member mobile between a second retracted position and a second advanced position The rotating disc, the first guide member and the second guide member are phase-activatable such as to transfer containers from and onto the conveyor line.

4 Claims, 12 Drawing Sheets

(56) References Cited

U.S. PATENT DOCUMENTS

| | | | |
|---|---|---|---|
| 4,798,648 A * | 1/1989 | Freeman | 156/542 |
| 6,446,781 B1 | 9/2002 | Devillele | |
| 8,061,502 B2 * | 11/2011 | Klaiber et al. | 198/396 |
| 2007/0251805 A1 | 11/2007 | Lanfranchi | |

* cited by examiner

US 9,073,705 B2

DEVICE AND METHOD FOR REMOVING AND REPLACING CONTAINERS FROM A CONVEYOR LINE

FIELD OF THE INVENTION

The present invention relates to a device for removing containers to be treated, such as flagons, vials or bottles, from a container conveyor line and for replacing the containers once treated newly on the container conveyor line, as well as a method actuated by the device.

DESCRIPTION OF THE PRIOR ART

Numerous industrial applications can be mentioned where there is a need for removing one or more containers from a container conveyor line, in order to treat or perform work operations on the container according to required applicational needs, and then for newly replacing the container on the conveyor line from which it was previously removed.

Devices are known, for example for statistical weighing of containers, positionable upstream and downstream of container filling stations of an apparatus for filling and sealing containers: these weighing devices collect a predetermined percentage of containers from a container conveyor line which is a part of the apparatus, perform a weighing of the containers thus-removed, and newly replace the weighed containers onto the conveyor line, so that by weighing the empty containers and the full containers the quantity of product introduced into the containers can be statistically controlled.

A device for statistical weighing of containers comprises: a frame; a first lateral guide wall that is integral to the frame and is arranged at a first side of the conveyor line for laterally guiding the containers advancing along the conveyor line; a second lateral guide wall that is integral to the frame, is distanced from the first lateral guide wall, is arranged downstream of the first lateral guide wall with respect to an advancing direction of the containers along the conveyor line and is arranged at the first side of the conveyor line for laterally guiding the containers advancing along the conveyor line; a rotating disc for moving at least one container, the rotating disc exhibiting a peripheral edge where at least one recess is afforded, forming a seat for drawing a container; suction means activatable such as to retain a container in the seat of the rotating disc; the rotating disc being arranged at the first side of the conveyor line, between the first lateral guide wall and the second lateral guide wall, to draw a container to be treated from the conveyor line in cooperation with the suction means and to release a treated container to the conveyor line in cooperation with the suction means.

Further, the device comprises weighing means cooperating with the rotating disc for weighing the containers drawn by the rotating disc.

For some applications, in particular if the containers are small bottles (for example having a 14 mm diameter), it is necessary to constantly ensure (with the exception of when the containers are retained in the seats of the rotating disc following activation of the suction mean) a lateral guide for the bottles transiting between the first lateral wall and the second lateral wall, whether they are bottles that do not have to be weighed or bottles to be weighed which have to be switched onto the rotating disc or even bottles that have already been weighed and are newly to be replaced on the conveyor line.

The weighing devices of known type comprise lateral guide means for the bottles, but these means do not guarantee constant guiding of the bottles during transit thereof between the first lateral guide wall and the second lateral guide wall.

As a consequence, the bottles can be overturned; to limit this risk, it is necessary to limit the advancement velocity of the bottles along the conveyor line.

This drawback is even more keenly felt with small-dimension bottles, where the advancement velocity has to be reduced more greatly.

SUMMARY OF THE INVENTION

The aim of the present invention consists in obviating the above-cited drawback.

The aim is attained by means of a device for removing containers to be treated from a conveyor line of containers, and for replacing the treated containers newly on the container conveyor line, according to claim 1, and a method actuated by the device according to claim 4.

According to claim 1, the device comprises: a frame; a first lateral guide wall that is integral to the frame and is arranged at a first side of the conveyor line for laterally guiding the containers advancing along the conveyor line; a second lateral guide wall that is integral to the frame, is distanced from the first lateral guide wall, is arranged downstream of the first lateral guide wall with respect to an advancing sense of the containers along the conveyor line and is arranged at the first side of the conveyor line for laterally guiding the containers advancing along the conveyor line; a rotating disc for moving at least one container, the rotating disc exhibiting a peripheral edge where at least one recess is achieved, said recess forming a seat for drawing a container; suction means activatable to retain a container in the seat of the rotating disc; the rotating disc being arranged at the first side of the conveyor line, between the first lateral guide wall and the second lateral guide wall, to draw a container to be treated from the conveyor line in cooperation with the suction means and to release a container treated to the conveyor line in cooperation with the suction means; characterised in that the device further includes: a first guide member for laterally guiding the containers advancing along the conveyor line, said first guide member exhibiting a guide surface that is as long as at least from the second lateral guide wall to the first lateral guide wall, the first guide member being movable along the conveyor line between a first back position, wherein the first guide member is at least partially engaged with the first lateral guide wall, and a first advanced position, wherein the first guide member is arranged between the first lateral guide wall and the second lateral guide wall to laterally guide the containers advancing along the conveyor line and moving between the first lateral guide wall and the second lateral guide wall; a second guide member for laterally guiding the containers advancing along the conveyor line, exhibiting a guide surface that extends at least as far as the distance between the second lateral guide wall and the first lateral guide wall, the second guide member being movable along the conveyor line between a second retracted position, wherein the second guide member is arranged between the first lateral guide wall and the second lateral guide wall to laterally guide the containers advancing along the conveyor line and moving between the first lateral guide wall and the second lateral guide wall, and a second advanced position, wherein the second guide member is at least partially engaged with the second lateral guide wall; the first guide member and the second guide member being activatable to mutually cooperate to allow at least one container to be treated to be transferred from the conveyor line to a respective seat of the rotating disc and to allow a container being treated to be transferred from the seat of the rotating disc to the conveyor line, while guiding the containers that advance along the conveyor line and that move between the first lateral guide wall and the second lateral guide wall.

According to claim 4, the method, comprises following steps in succession:

positioning the first guide member in a first service position, wherein the first guide member is able to laterally guide the containers along the conveyor line from the first lateral guide wall to a tangential area wherein the rotating disc is tangential to the conveyor line, and positioning the second guide member in a second service position wherein the second guide member is able to laterally guide the containers along the conveyor line from the tangential area to the second lateral guide wall, the first guide member and the second guide member being mutually arranged to laterally guide the containers advancing along the conveyor line between the first lateral guide wall and the second lateral guide wall;

moving the second guide member towards the second advanced position to create a first lateral opening and laterally guide the containers that precede the first container to be treated and that advance along the conveyor line, the first lateral opening extending from the first guide member to the second lateral guide wall to allow at least one container to be treated to be transferred from the conveyor line to a respective seat of the rotating disc;

moving the first guide member towards the first advanced position to laterally guide the containers that follow a last container to be treated and that advance along the conveyor line between the first lateral guide wall and the second lateral guide wall;

concurrently moving the first guide member towards the first retracted position and the second guide member towards the second retracted position so as to guarantee the lateral guiding of the containers that advance along the conveyor line between the first lateral guide wall and the second lateral guide wall;

moving the second guide member towards the second service position to create a second lateral opening and laterally guide containers that precede the first treated container to be transferred to the conveyor line and that advance along the conveyor line, the second lateral opening extending between the first lateral guide wall and the second guide member to allow at least one treated container to be transferred from a corresponding seat of the rotating disc newly to the conveyor line;

moving the first guide member towards the first service position to laterally guide containers that follow a last treated container newly replaced on the conveyor line.

BRIEF DESCRIPTION OF THE DRAWINGS

Specific embodiments of the invention will be described in the following part of the present description, according to what is reported in the claims and with the aid of the accompanying tables of drawings, in which:

DESCRIPTION OF THE PREFERRED EMBODIMENTS

Figure 1:
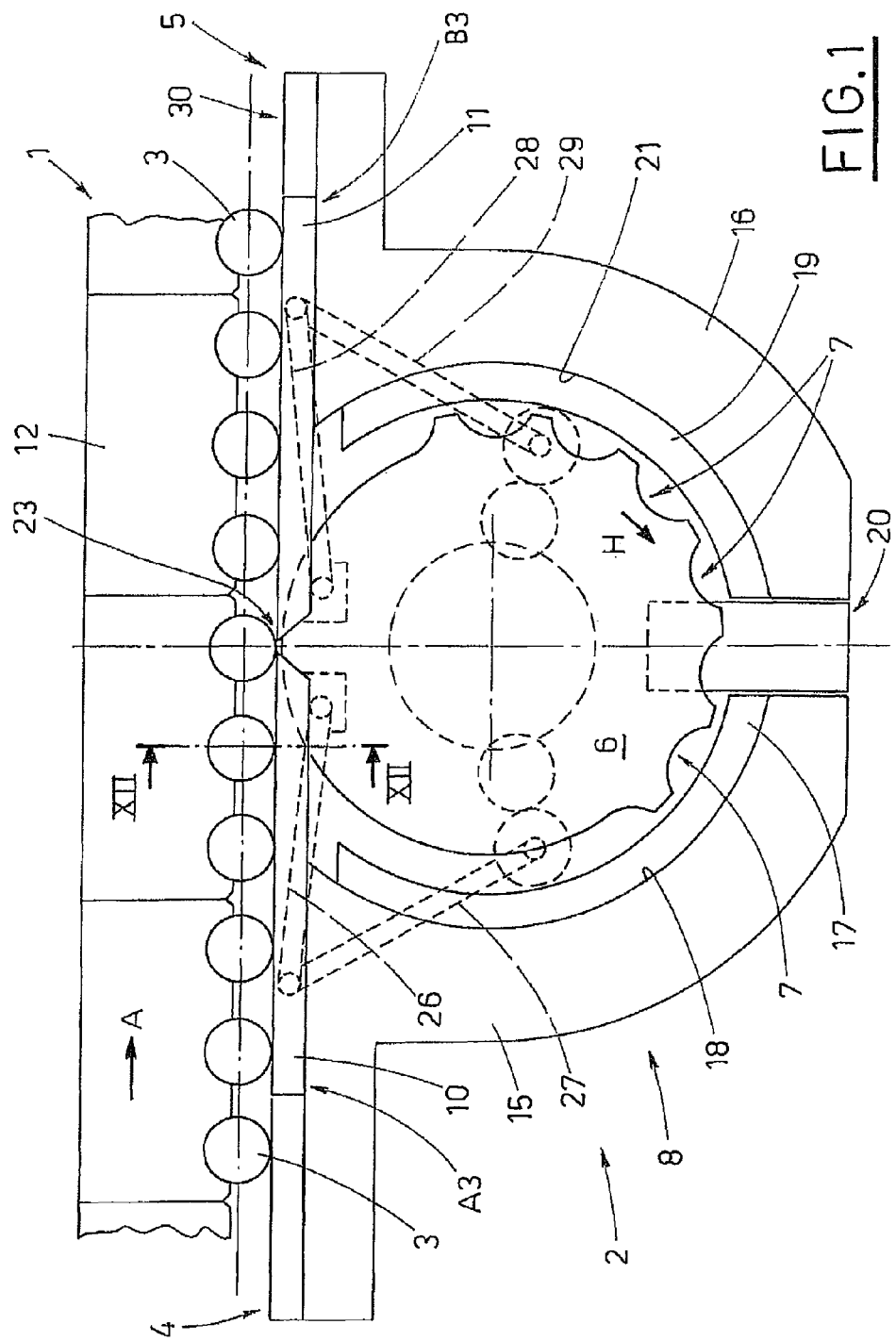
FIG. 1 illustrates a view from above of a device of the invention in a configuration in which the containers transit freely along the conveyor line, between the first lateral guide wall and the second lateral guide wall, without being removed.

With reference to the accompanying tables of drawings, 1 denotes a conveyor line of containers, such as vials, flagons or bottles, and 2 denotes a device for removing the containers to be treated from a container conveyor line and replacing the treated containers newly on the container conveyor line, object of the present invention.

The conveyor line 1 moves a plurality of containers 3 along a supply direction, in an advancement direction A; the device is activated in phase relation with the conveyor line 1 such as to remove a certain number of containers 3 to be treated from the conveyor line 1 and for newly replacing the containers 3 on the conveyor line 1 once they have been treated.

The device 2 comprises: a frame 8; a first lateral guide wall 4 that is integral to the frame 8 and is arranged at a first side 5 of the conveyor line 1 for laterally guiding the containers 3 advancing along the conveyor line 1; a second lateral guide wall 30 that is integral to the frame 8, is spaced apart from the first lateral guide wall 4, is arranged downstream of the first lateral guide wall 4 with respect to an advancing sense A of the containers 3 along the conveyor line 1 and is arranged at the first side 5 of the conveyor line for laterally guiding the containers advancing along the conveyor line 1; a rotating disc 6 for moving at least one container 3, the rotating disc 6 exhibiting a peripheral edge 9 where at least one recess is achieved, said recess forming a seat 7 for drawing a container 3; suction means activatable to retain a container 3 in the seat 7 of the rotating disc 6.

The rotating disc 6 is arranged at the first side 5 of the conveyor line 1, between the first lateral guide wall 4 and the second lateral guide wall 30, such as to remove a container 3 to be treated from the conveyor line 1 in cooperation with the suction means and to return a treated container 3 to the conveyor line 1 in cooperation with the suction means.

Further, the device 2 comprises: a first guide member 10 for laterally guiding the containers 3 advancing along the conveyor line 1, the first guide member 10 exhibiting a guide surface that extends at least from the second lateral guide wall 30 to the first lateral guide wall 4, the first guide member 10 being movable along the conveyor line 1 between a first retracted position A1 (FIG. 1), wherein the first guide member 10 is at least partially engaged with the first lateral guide wall 4, and a first advanced position A2 (FIG. 5), wherein the first guide member 10 is arranged between the first lateral guide wall 4 and the second lateral guide wall 30 to laterally guide the containers 3 advancing along the conveyor line 1 and moving between the first lateral guide wall 4 and the second lateral guide wall 30; a second guide member 11 for laterally guiding the containers 3 advancing along the conveyor line 1, said second guide member 11 exhibiting a guide surface that extends at least from the second lateral guide wall 30 to the first lateral guide wall 4, the second guide member 11 being movable along the conveyor line 1 between a second retracted position B1, wherein the second guide member 11 is arranged between the first lateral guide wall 4 and the second lateral guide wall 30 such as to laterally guide the containers 3 advancing along the conveyor line 1 and moving between the first lateral guide wall 4 and the second lateral guide wall 30, and a second advanced position B2, wherein the second guide member 11 is at least partially engaged with the second lateral guide wall 30; the first guide member 10 and the second guide member 11 being activatable to mutually cooperate to allow at least one container 3 to be treated to be transferred from the conveyor line 1 to a respective seat 7 of the rotating disc 6 and to allow a container 3 being treated to be transferred from the seat 7 of the rotating disc 6 to the conveyor line 1, while guaranteeing the guiding of the containers 3 advancing along the conveyor line 1 and moving between the first lateral guide wall 4 and the second lateral guide wall 30.

The method for removing the containers 3 to be treated from a container conveyor line 1 and for replacing the treated containers 3 newly on the container conveyor line 1, actuable by the above-described device 2, comprises following successive steps:

positioning the first guide member 10 in a first service position A3 (FIG. 1), wherein the first guide member 10 is able to laterally guide the containers 3 along the conveyor line 1 from the first lateral guide wall 4 to a tangential area wherein the rotating disc 6 is tangential to the conveyor line 1, and positioning the second guide member 11 in a second service position B3 wherein the second guide member 11 is able to laterally guide the containers 3 along the conveyor line 1 from the tangential area to the second lateral guide wall 30, the first guide member 10 and the second guide member 11 being mutually arranged such as to laterally guide the containers 3 advancing along the conveyor line 1 between the first lateral guide wall 4 and the second lateral guide wall 30;

moving the second guide member 11 towards the second advanced position B2 (FIG. 3) to create a first lateral opening and laterally guide the containers 3 that precede the first container 3 to be treated and that advance along the conveyor line 1, the first lateral opening extending from the first guide member 10 to the second lateral guide wall 30 such as to allow at least one container 3 to be treated to be transferred from the conveyor line 1 to a respective seat 7 of the rotating disc 6;

moving the first guide member 10 towards the first advanced position A2 (FIG. 5) such as to laterally guide the containers 3 that follow a last container 3 to be treated and that advance along the conveyor line 1 between the first lateral guide wall 4 and the second lateral guide wall 30;

concurrently moving the first guide member 10 towards the first retracted position A1 and the second guide member 11 towards the second retracted position B1 (FIG. 7) so as to laterally guide the containers 3 that advance along the conveyor line 1 between the first lateral guide wall 4 and the second lateral guide wall 30;

moving the second guide member 11 towards the second service position B3 (FIG. 9) to create a second lateral opening and laterally guide containers 3 that precede the first treated container 3 to be transferred to the conveyor line 1 and that advance along the conveyor line 1, the second lateral opening extending between the first lateral guide wall 4 and the second guide member 11 such as to allow at least one treated container 3 to be transferred from a corresponding seat 7 of the rotating disc 6 newly to the conveyor line 1; moving the first guide member 10 towards the first service position A3 to laterally guide containers 3 that follow a last treated container 3 put again on to the conveyor line 1.

The rotation axis of the rotating disc 6 is vertical, while the containers 3 are moved along the conveyor line 1 in a horizontal and tangential direction to the rotating disc 6.

Figure 12:
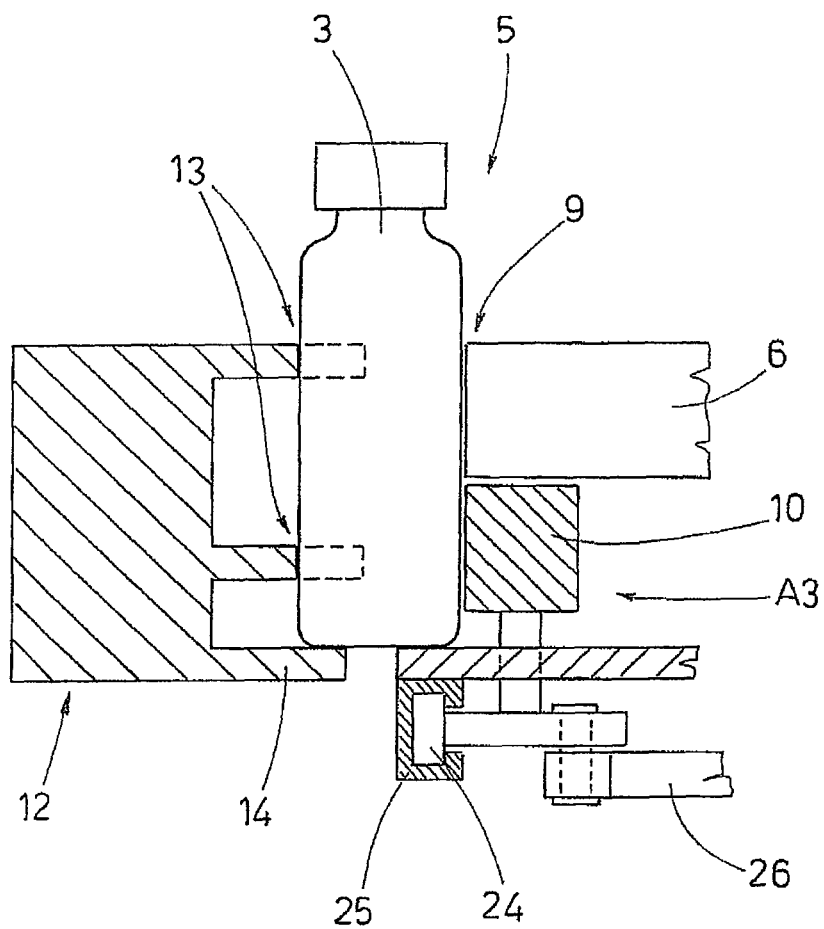
FIG. 12 is the cross-section view along XII-XII of FIG. 1.

The first guide member 10 is preferably a first lateral movable edge 10; the first movable lateral edge 10 can be provided with a carriage 24 (FIG. 12) so that it can slide along a first straight guide 25 fixed to the first support 15, such that the first lateral movable edge 10 can slide parallel to the advancement direction A of the containers 3. The activating means of the first guide member 10 can be pneumatic (solution not illustrated) or can comprise: a first motor (not illustrated); a first arm 26 that is hinged to the first lateral movable edge 10, and a second arm 27 that is hinged to the first arm 26, at an end thereof, and which is connected to the output shaft of the first motor at another end thereof.

The second guide member 11 is preferably a second lateral movable edge 11; the second lateral movable edge 11 can be provided with a carriage (not illustrated) so that it can slide along a second straight guide 25 (not illustrated) fixed to the second support 16, such that the second lateral movable edge 11 can slide parallel to the advancement direction A of the containers 3. The activating means of the second guide means 11 can be pneumatic (not illustrated) or can comprise: a second motor (not illustrated); a third arm 28 which is hinged to the second lateral movable edge 10, and a fourth arm 29 which is hinged to the third arm 28, at an end thereof, and which is connected to the output shaft of the second motor at another end thereof.

The conveyor line 1 can comprise displacing modules 12 suitable for each drawing a certain number of containers 3; in the illustrated example a displacement module 12 can draw three containers. In a known way, each displacement module 12 forms three seats 13 (in the example of FIG. 12 each displacement module 12 is provided with two superposed seats 13 for each container 3) such as to embrace the containers 3 and a base 14 for partially supportingly receiving the containers 3.

The conveyor line 1 can further comprise a horizontal sliding track on which the containers 3, moved by the displacement modules 12, can slide; in particular, each container 3 moved by a displacement module 12 is partially supported on the sliding tract and partially supported on the base of the displacement module 12 itself.

The first lateral guide wall 4, the first lateral movable edge 10, the second lateral movable edge 11 and the second lateral guide wall 30 are predisposed to laterally guide the containers 3 transiting along the tract of the conveyor line 1 which is located at the position of the device 2; in this tract of the conveyor line 1, the containers 3 can be switched onto the rotating disc 6 such as to be treated or newly replaced on the conveyor line 1 by the rotating disc 6 once they have been treated, or can proceed on their path along the conveyor line 1 without being treated, and it is of primary importance that they maintain the vertical position thereof without any risk of overturning.

The first lateral guide wall 4 is for example a part of a first support 15 which is fixed to the frame 8; the second lateral guide wall 30 is for example a part of a second support 16 which is fixed to the frame 8. The first support 15 is conformed and arranged, with respect to the conveyor line 1, in such a way that the first lateral guide wall 4 abuts and guides the containers 3 moved by the displacement modules 12 and which advance along the conveyor line 1. The second support 16 is conformed and arranged, with respect to the conveyor line 1, such that the second lateral guide wall 30 abuts and guides the containers moved by the displacement modules 12 and which advance along the conveyor line 1.

In the example illustrated in the figures, the first support 15 is arranged above the first lateral movable edge 10; the first lateral movable edge 10 can completely slide under the first support 15, such that at least in some positions assumed by the first lateral movable edge 10 the first lateral guide wall 4 can be at least partially superposed on the first lateral movable edge 10.

Likewise, the second support 16 is arranged above the second lateral movable edge 11; the second lateral movable edge 11 can completely slide under the second support 16, such that at least in some positions assumed by the second lateral movable edge 11 the second lateral guide wall 30 can be at least partially superposed on the second lateral movable edge 11.

The first support 15 comprises a first sliding plane 17 for supportingly receiving the containers 3 drawn by the rotating disc 6 and which have already been treated; the first sliding plane 17 has an arched conformation such as to follow the circular path imposed by the rotating disc 6 on the containers 3 lodged in the seats 7 thereof; further, the first support 15 is provided with a third lateral guide wall 18 which originates perpendicularly from the first sliding plane 17 and which cooperates with the rotating disc 6 such as to laterally guide the containers 3 that have been treated and which have to be newly replaced on the conveyor line 1.

The second support 16 comprises a second sliding plane 19 for supportingly receiving the containers 3 drawn by the rotating disc 6 and which still have to be treated; the second sliding plane 19 has an arched conformation such as to follow the circular path imposed by the rotating disc 6 on the containers 3 lodged in the seats 7 thereof; further, the second support 16 is provided with a fourth lateral guide wall 21 which originates perpendicularly from the second sliding plane 19 and which cooperates with the rotating disc 6 such as to laterally guide the containers 3 that have been treated and which have to be newly replaced on the conveyor line 1.

The device 2 of the invention comprises means 20 of known type for treating the containers 3, which act at a tract of the peripheral edge 9 of the rotating disc 6 between the first support 15 and the second support 16, such as to treat each container 3 drawn by the rotating disc 6.

The device 2 is preferably suitable for statistical weighing of the containers 3 supplied by the conveyor line 1; effectively the treatment of these containers 3 consists in weighing them. The means for treating the containers 3 are therefore weighing means 20.

The conveyor line 1 and the device 2 for statistical weighing of the containers 3 are part, for example, of a filling and sealing apparatus of containers 3.

In the following reference will be made to a device 2 for statistical weighing of containers 3.

FIGS. 1 to 11 illustrate an operating cycle in which the weighing device 2 is activated to transfer a batch of containers 3 (six containers 3 in the illustrated example) from the conveyor line 1, which containers 3 are to be weighed on the rotating disc 6, so that the batch of containers 3 can be weighed, and for transferring the batch of weighed container 3 from the rotating disc 6 newly onto the conveyor line 1, according to the method which is also an object of the present invention. There now follows a description of the operating cycle.

With reference to FIG. 1, the weighing device 2 is in a configuration in which the containers 3 transit freely along the conveyor line 1, between the first lateral guide wall 4 and the second lateral guide wall 30, without being weighed; in this case, the first lateral movable edge 10 and the second lateral movable edge 11 are positioned with respect to one another such as to laterally guide the containers 3 during transit thereof between the first lateral guide wall 4 and the second lateral guide wall 30.

The first lateral movable edge 10 is in the first service position A3 and the first lateral guide wall 4 is partially superposed on the first lateral movable edge 10; the second lateral movable edge 11 is in the second service position B3 and the second lateral guide wall 30 is partly superposed on the second lateral movable edge 11.

The end of the first lateral mobile edge 10 facing the end of the second lateral mobile edge 11 is in the tangential region 23 of the conveyor line 1 with the rotating disc 6.

Still with reference to FIG. 1, the movement of the rotating disc 6 is shown in a rotation direction H that is such as to bring the seats 7 into a suitable position for carrying out the subsequent removal operations of the containers 3 from the conveyor line 1.

Figure 2:
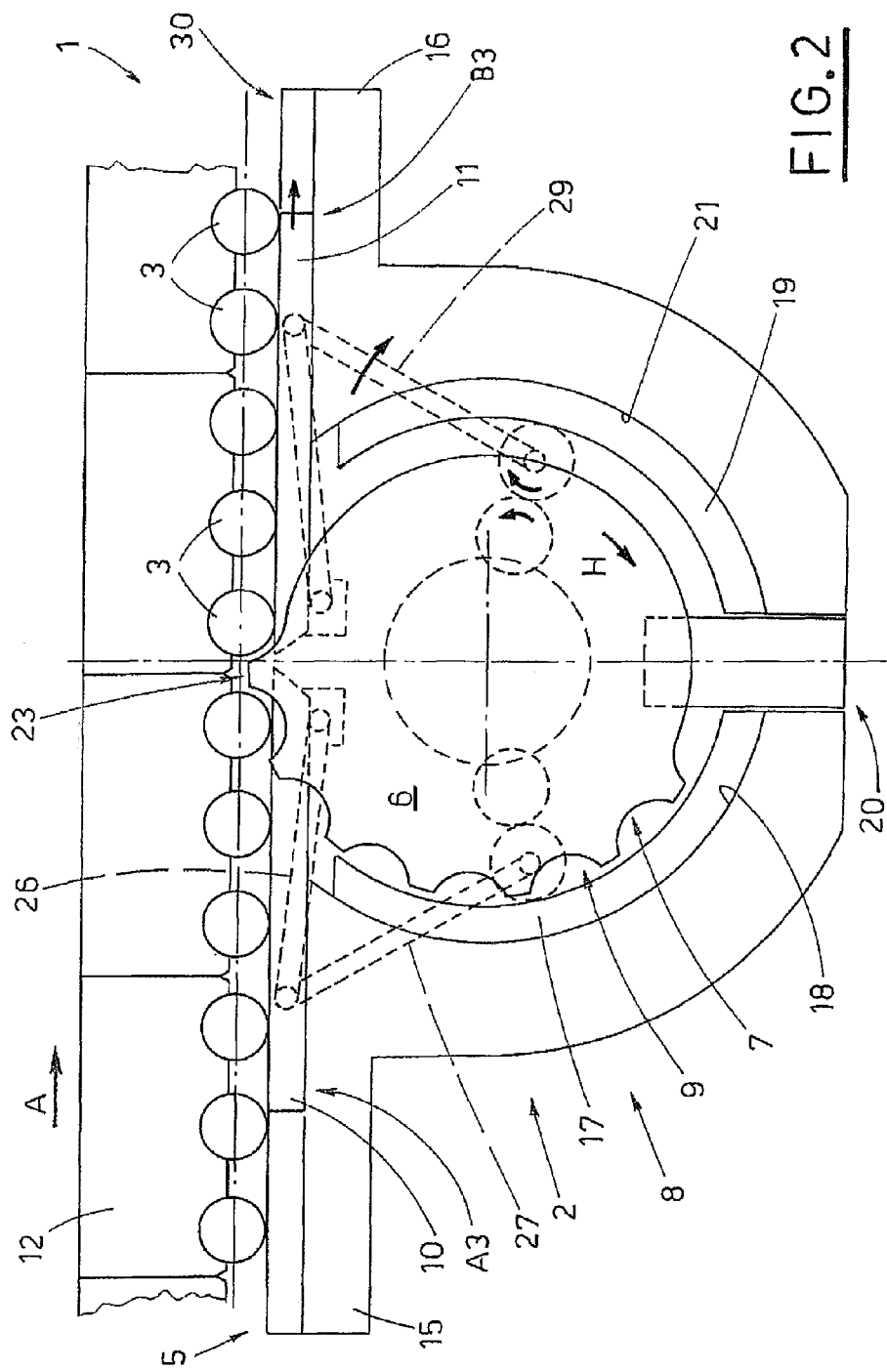
FIGS. 2 to 11 illustrate, in a corresponding number of views from above, the device of FIG. 1 during successive steps of a method of the invention, in which the removal of a batch of containers from the conveyor line is performed, followed by the treatment thereof (which in the example consists in weighing them) and the following return of the treated batch of containers onto the conveyor line.

With reference to FIG. 2, the rotating disc 6 has been rotated to bring the relative seats 7 to engage with the containers 3 advancing along the conveyor line 1 and which have to be weighed.

Figure 3:
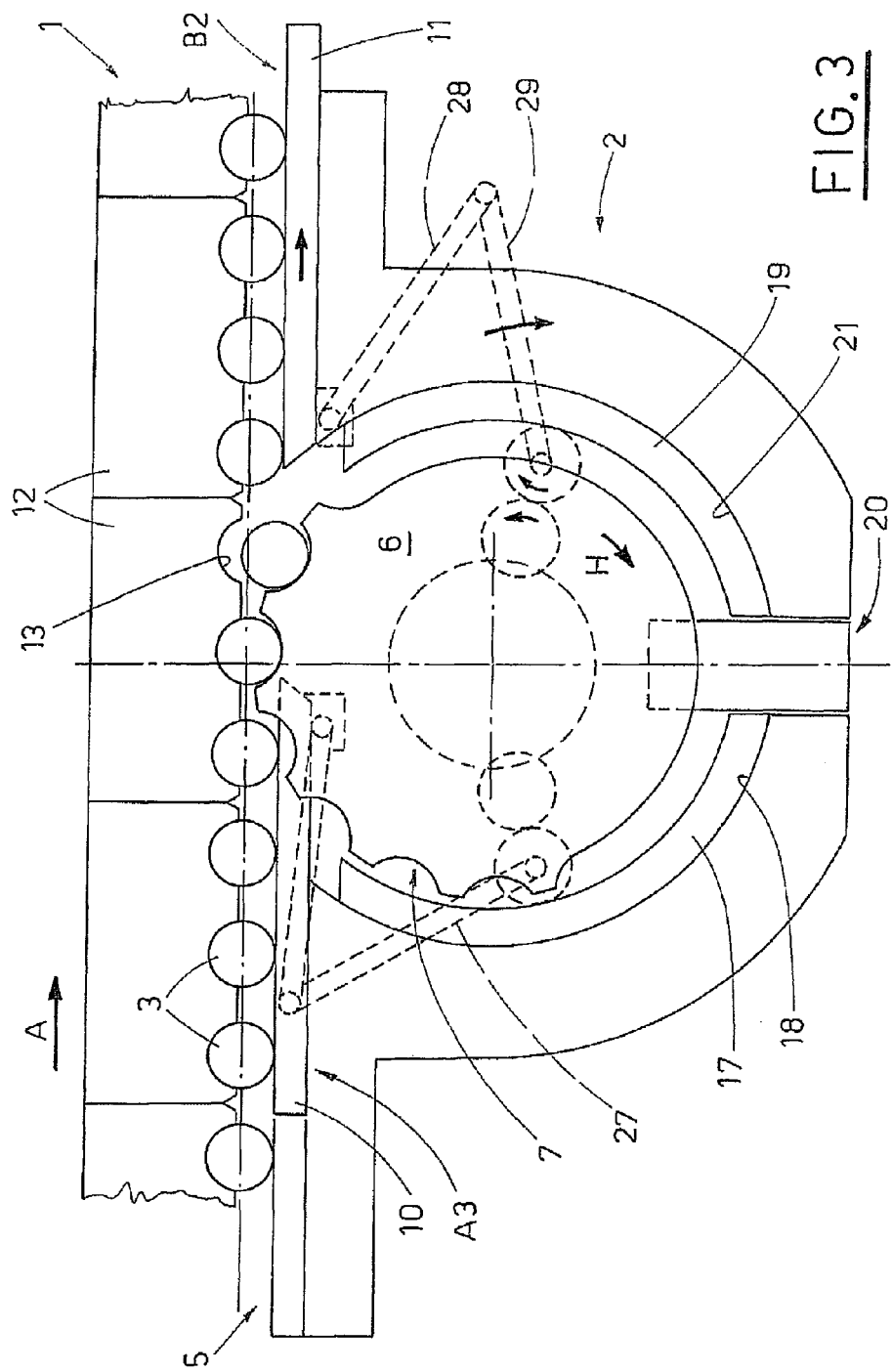

At this point the first lateral movable edge 10 stays in the first service position A3, while the second lateral movable edge 11 is moved towards the second advanced position B2 in order to create the first lateral opening which extends between the first lateral movable edge 10 on one side and the second lateral guide wall 30 on the other side, and to laterally guide the containers 3 preceding the containers to be weighed and which advance along the conveyor line 1 towards the second lateral guide wall 30 (see FIG. 3).

The first lateral movable opening enables transfer of the containers 3 to be weighed from the conveyor line 1 to the seats 7 of the rotating disc 6.

The second lateral movable opening 11 is thus moved in the advancement direction A in phase relation with the advancing of the containers 3 along the conveyor line 1: in particular, the second lateral movable edge 11 passes instantaneously from a nil velocity to the advancement velocity of the containers 3 along the conveyor line 1: in particular, the second lateral movable edge 11 passes instantaneously from a nil advancement velocity to the advancement velocity of the containers 3 along the conveyor line 1 such as to laterally guide the containers 3 up until they reach the second lateral guide wall 30.

When the second lateral movable edge 11 reaches the second advanced position B2 the second guide wall 30 is completely superposed on the second lateral movable edge 11.

The suction means comprise a depression source and preferably suction channels (not indicated) which open at the internal wall of each seat 7 of the rotating disc 6 and which communicate with the depression source. The suction means are configured such as to selectively activate the suction in one or more seats 7 contemporaneously through the respective suction channels; the activation of the suction in a suction channel enables deviating the containers 3 which advance on the conveyor line 1 along the supply direction at the tangential region and stably retaining, in the corresponding seat 7, the container 3 which lodges in the seat 7.

Figure 4:
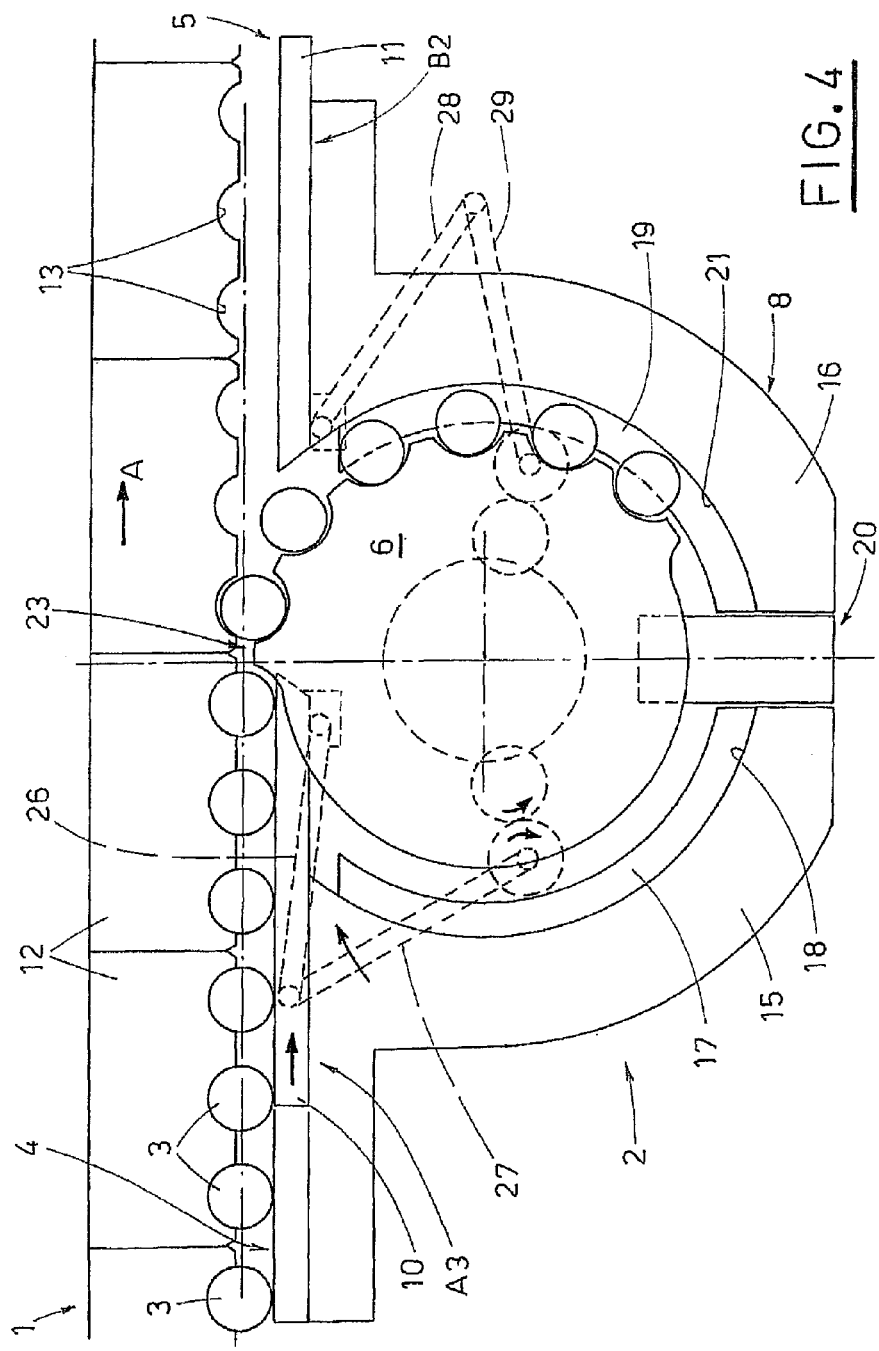

The rotating disc 6 and the suction means are activated in phase relation with the advancing of the containers 3 along the conveyor line 1 such that each container 3 to be weighed engages with a seat 7 of the rotating disc 6 at the tangential region 23; the container 3 to be weighed is stably retained in the seating 7 of the rotating disc 6 by effect of the suction exerted through the corresponding suction channel and transferred on the circular path identifiable between the rotating disc 6, the first support 15 and the second support 16. The activating channel can be deactivated once the container 3 begins sliding on the second sliding plane 19 and is guided by the fourth lateral guide wall 21 (FIG. 4).

Figure 5:
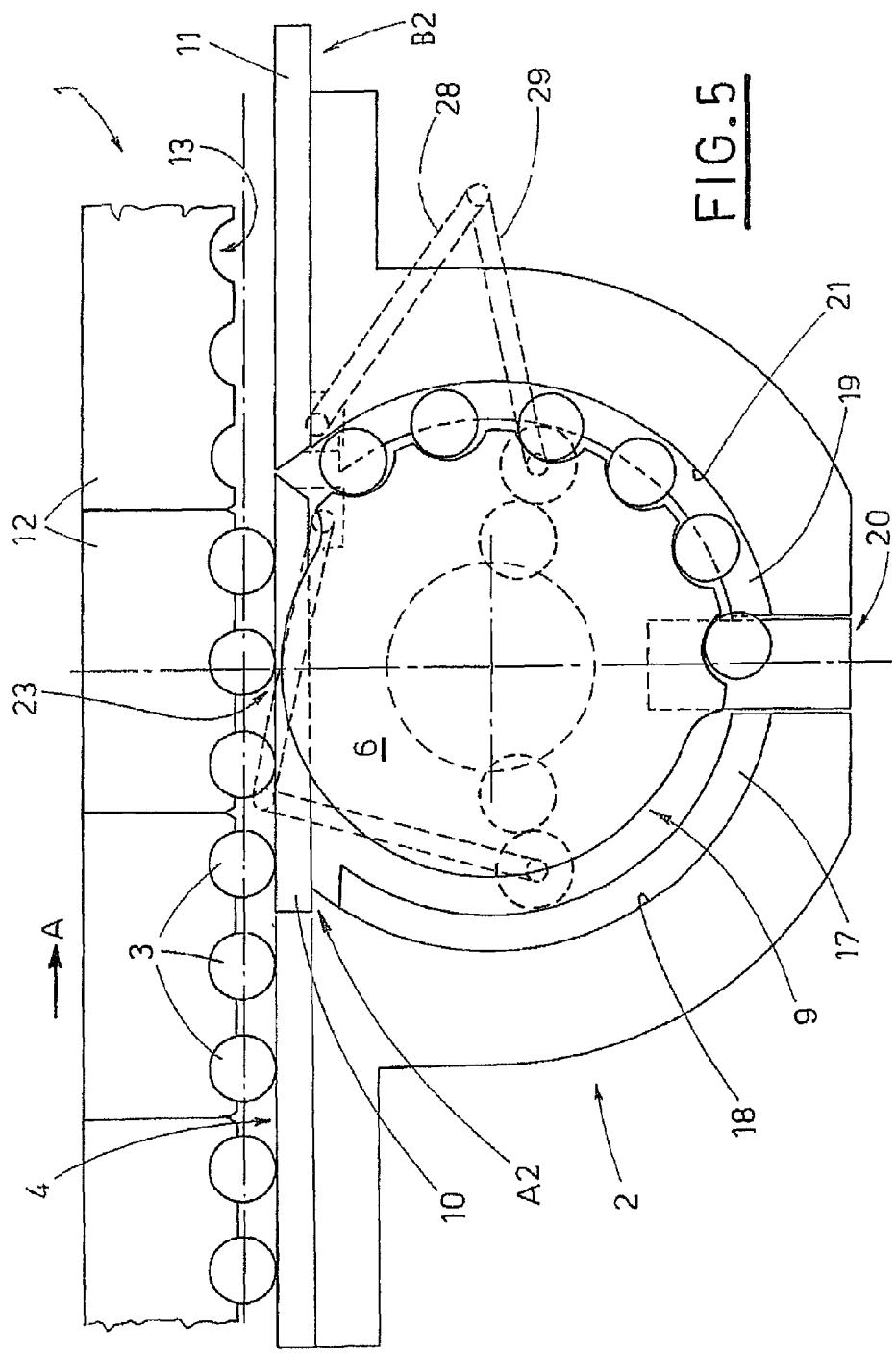

With reference to FIG. 5, the first lateral movable edge 10 is moved towards the first advanced position A2 such as to laterally guide the containers 3 which follow the last container 3 to be weighed and which advance along the conveyor line 1 between the first lateral guide wall 4 and the second lateral guide wall 30. The first lateral movable edge 10 is thus moved in the advancement direction A in phase relation with the advancing of the containers 3 along the conveyor line 1: in particular, the first lateral movable edge 10 passes instantaneously from a nil velocity to the advancement velocity of the containers 3 along the conveyor line 1 such as to laterally guide the containers 3 between the first lateral guide wall 4 and the second lateral guide wall 30.

The containers 3 removed from the rotating disc 6 reach, one-by-one, the weighing zone comprised between the first support 15 and the second support 16 and are weighed by the weighing means 20 in phase relation with the rotation of the rotating disc 6.

When the first lateral mobile edge 10 is in the first advanced position A2, there is only a minimum superposing (or even none at all) of the first lateral guide wall 4 with respect to the first lateral movable edge 10.

Figure 6:
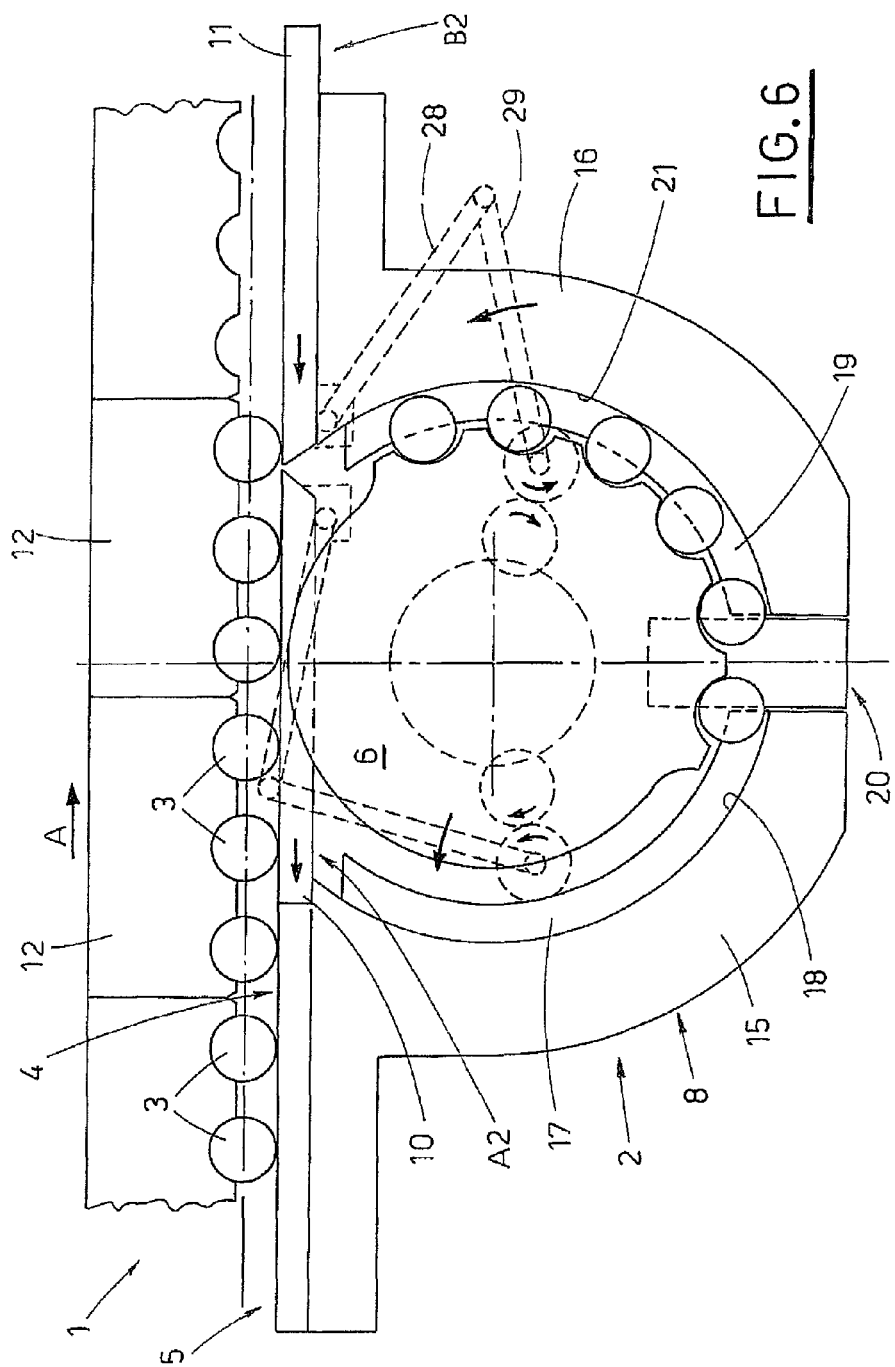
Figure 7:
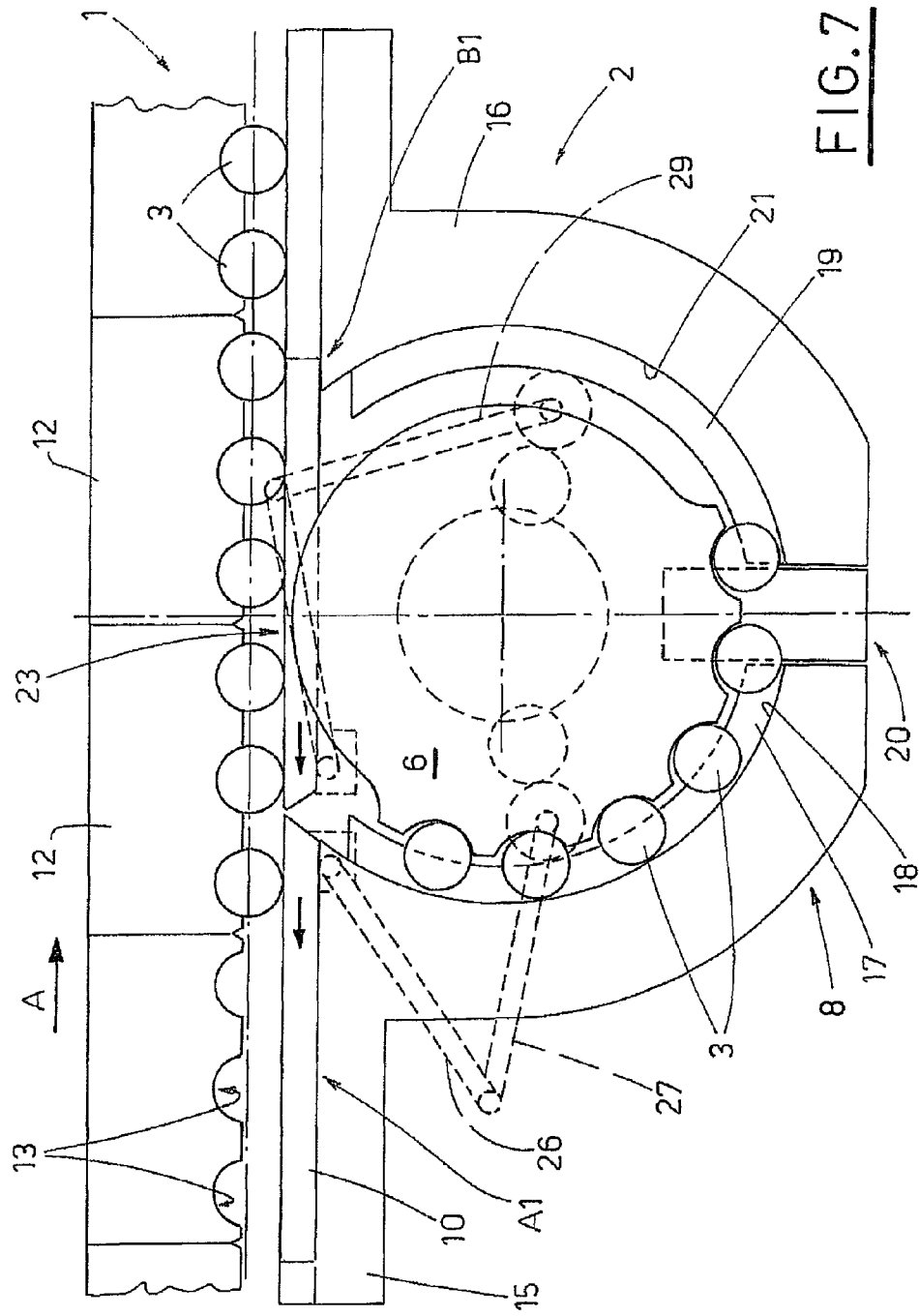

With reference to FIGS. 6, 7, the first lateral movable edge 10 is moved towards the first retracted position A1 contemporaneously with the movement of the second lateral mobile edge 11 towards the second retracted position B1; the contemporary movement of the first lateral movable edge 20 and the second lateral movable edge 11 guarantees the lateral guiding of the containers 3 which advance along the conveyor line 1 between the first lateral guide wall 4 and the second lateral guide wall 30.

When the first lateral movable edge 10 is in the first retracted position A1, the first lateral guide wall 4 is completely superposed on the first lateral movable edge 10.

When the second lateral mobile edge 11 is in the second retracted position B1, there is only a minimum superposing (or even none at all) of the second lateral guide wall 30 with respect to the second lateral movable edge 11.

The containers 3 that have already been weighed are drawn by the rotating disc 6 slidingly on the first sliding plane 17.

The replacing of the weighed containers 3 newly on the conveyor line 1 has to be regulated in phase relation with the device 2, by means of control devices (not illustrated) which regulate the supply of the containers 3 on the conveyor line 1. It will be necessary to have two displacement modules 12, advantageously consecutive, free of containers 3; the weighed containers 3 will have to be housed in the empty places of the two displacement modules 12.

By way of illustration of this, FIG. 7 shows a first displacement module 12 free of containers 3.

Figure 8:
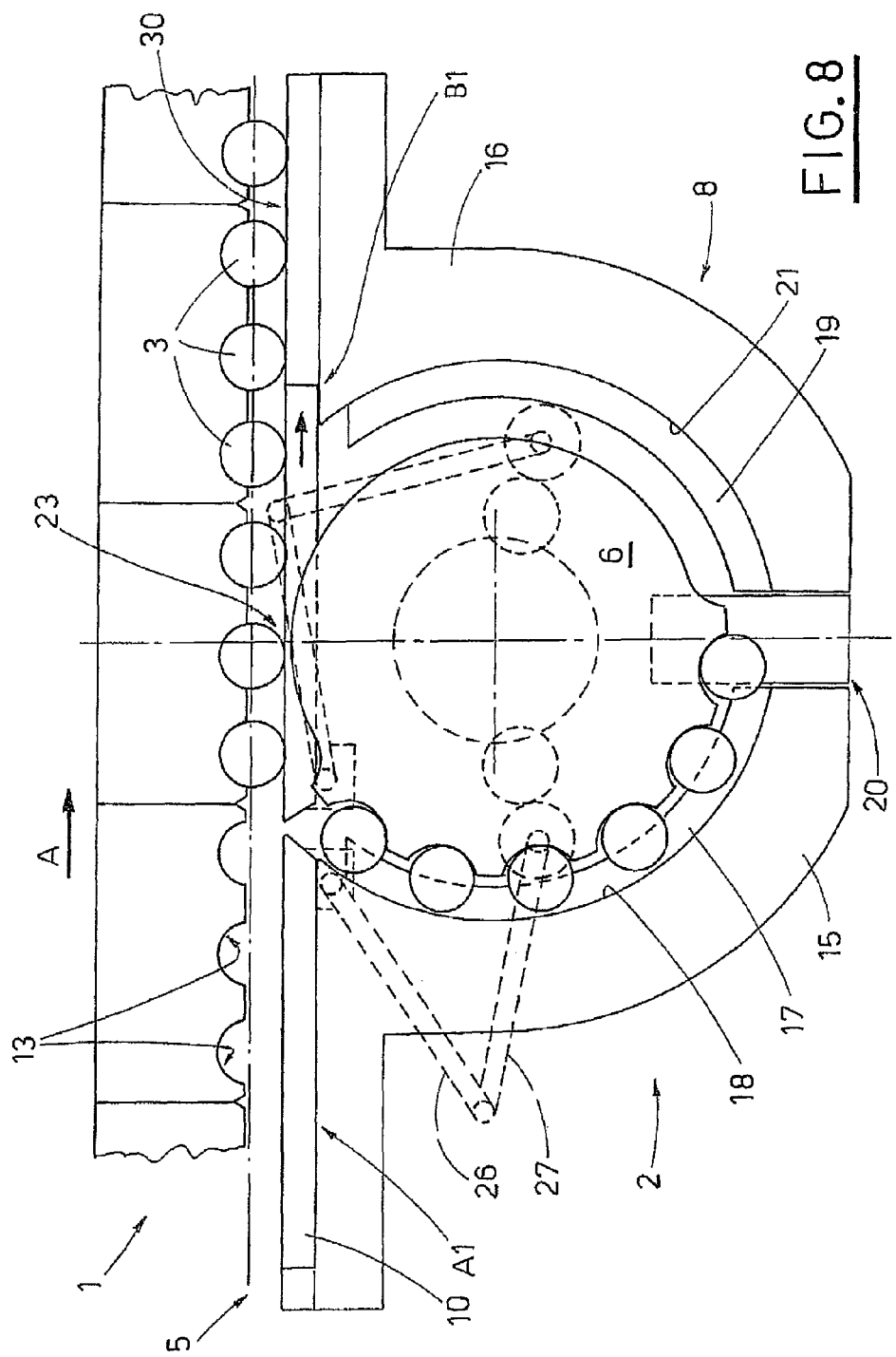
Figure 9:
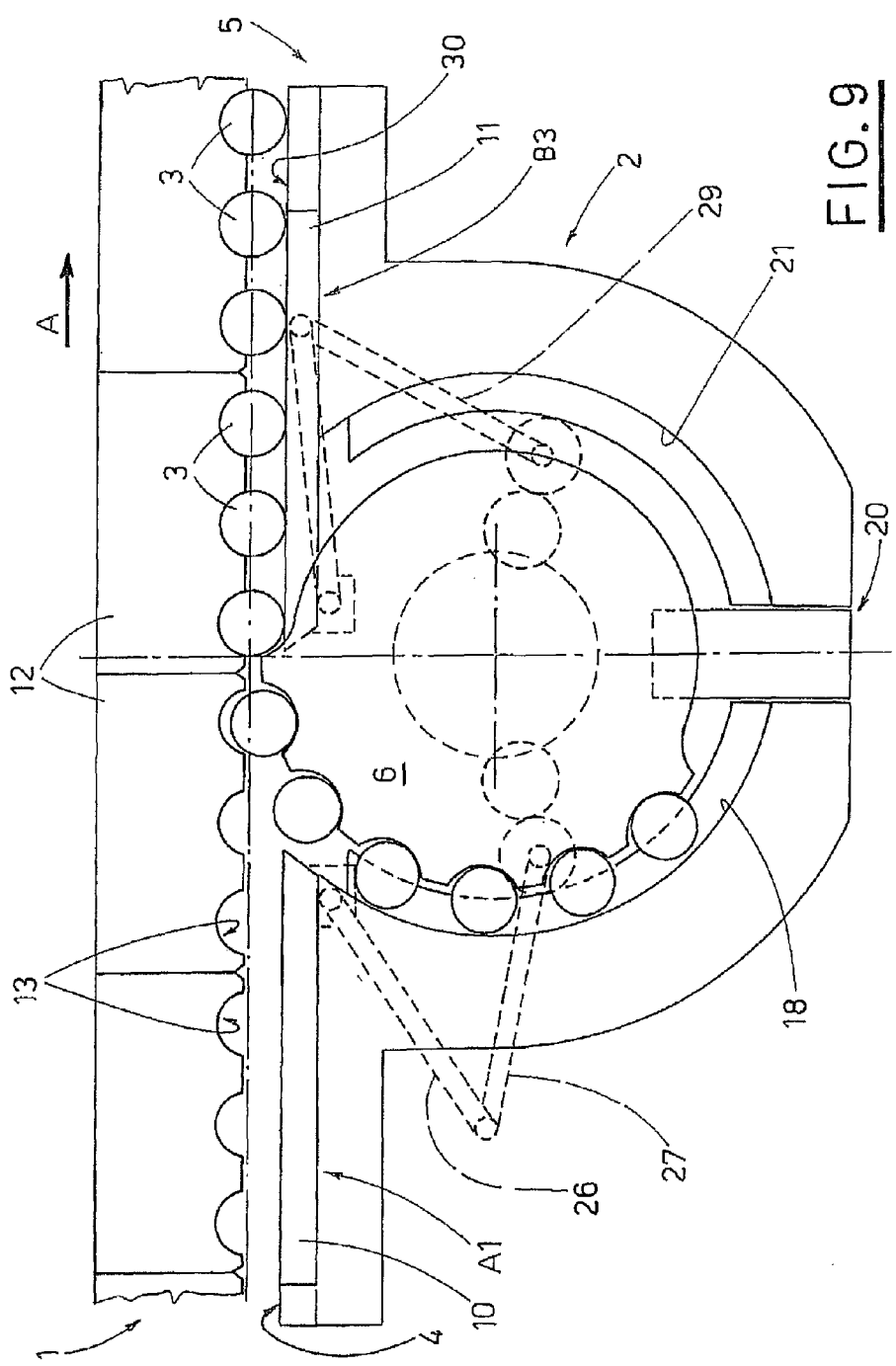

With reference to FIGS. 8, 9, the second lateral movable edge 11 is moved towards the second service position B3 such as to create a second lateral opening and for laterally guiding the containers 3 which precede the first weighed container 3 to be newly placed on the conveyor line 1 and which advance along the conveyor line 1; the second lateral opening extends between the first lateral guide wall 4 and the second lateral movable edge 11 such as to enable the transfer of the weighed containers 3 from the seats 7 of the rotating disc 6 newly on the conveyor line 1.

The suction means are activated such that the weighed containers 3 are retained in the seats 7 of the rotating disc 6 before they abandon the first sliding plane 17. The weighed containers 3 are then replaced on the conveyor line 1, and occupy the empty positions on the two displacement modules 12, deactivating the suction means.

Figure 10:
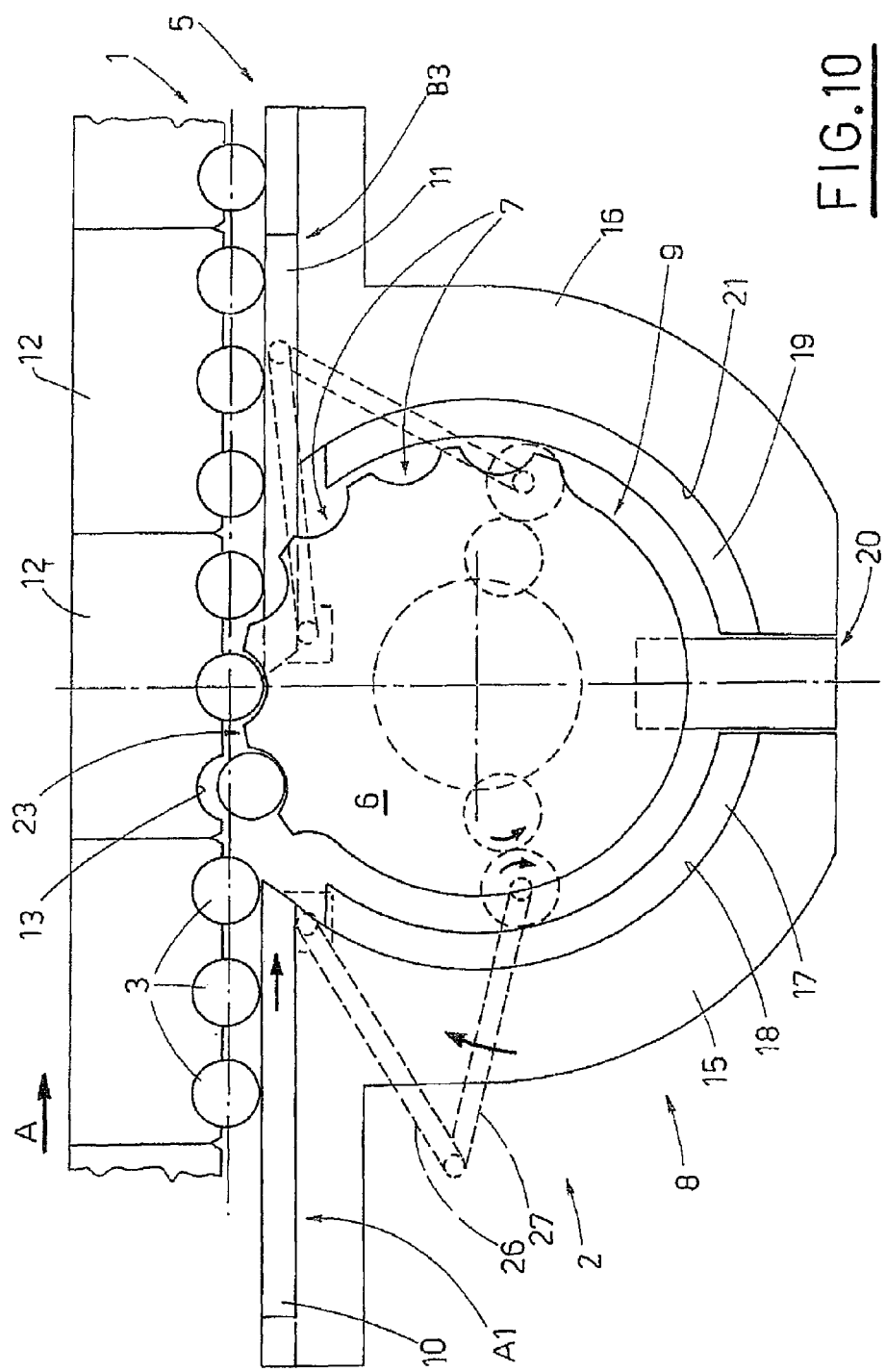
Figure 11:
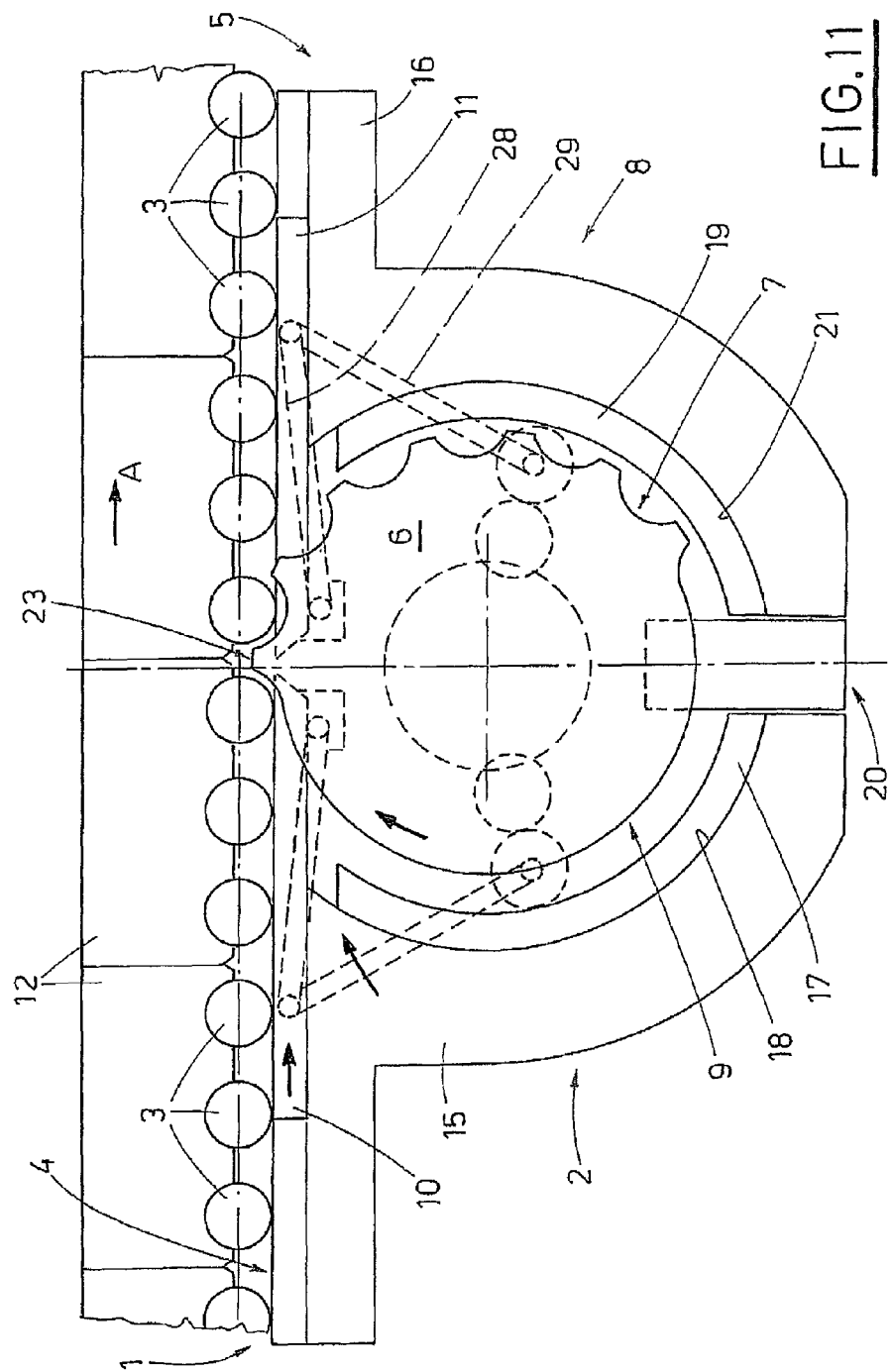

With reference to FIGS. 10, 11 the first lateral movable edge 10 is moved towards the first service position A3 such as to laterally guide the containers 3 which follow the final weighed container 3 newly placed on the conveyor line 1.

The foregoing has been described by way of non-limiting example, and any constructional variants are understood to fall within the protective scope of the present technical solution, as claimed in the following.

The invention claimed is:

1. Device for removing containers to be treated from a conveyor line and for replacing treated containers on the conveyor line, including:
   a frame;
   a first lateral guide wall that is integral to the frame and is arranged at a first side of the conveyor line for laterally guiding the containers advancing along the conveyor line;
   a second lateral guide wall that is integral to the frame, is distanced from the first lateral guide wall, is arranged downstream of the first lateral guide wall with respect to an advancing sense of the containers along the conveyor line and is arranged at the first side of the conveyor line for laterally guiding the containers advancing along the conveyor line;
   a rotating disc for moving at least a container, the rotating disc exhibiting a peripheral edge where at least a recess is achieved, said recess forming a seat for drawing a container;
   suction means activatable to retain a container in the seat of the rotating disc;
   the rotating disc being arranged at the first side of the conveyor line, between the first lateral guide wall and the second lateral guide wall, such as to draw a container to be treated from the conveyor line in cooperation with the suction means and to return a treated container to the conveyor line in cooperation with the suction means;
   a first guide member for laterally guiding the containers advancing along the conveyor line, said first guide member exhibiting a guide surface that extends at least from the second lateral guide wall to the first lateral guide wall, the first guide member being movable along the conveyor line between a first retracted position, wherein the first guide member is at least partially engaged with the first lateral guide wall, and a first advanced position, wherein the first guide member is arranged between the first lateral guide wall and the second lateral guide wall such as to laterally guide the containers advancing along the conveyor line and moving between the first lateral guide wall and the second lateral guide wall;
   a second guide member for laterally guiding the containers during advancing thereof along the conveyor line, said second guide member exhibiting a guide surface that extends at least from the second lateral guide wall to the first lateral guide wall, the second guide member being movable along the conveyor line between a second retracted position in which the second guide member is arranged between the first lateral guide wall and the second lateral guide wall such as to laterally guide the containers advancing along the conveyor line and moving between the first lateral guide wall and the second lateral guide wall, and a second advanced position, wherein the second guide member is at least partially engaged with the second lateral guide wall;
   the first guide member and the second guide member being activatable to mutually cooperate to allow at least one container to be treated to be transferred from the conveyor line to a respective seat of the rotating disc and to allow a container being treated to be transferred from the seat of the rotating disc to the conveyor line, while contemporaneously guaranteeing the guiding of the containers advancing along the conveyor line and transiting between the first lateral guide wall and the second lateral guide wall.

2. Device according to claim 1, wherein the first guide member is a first lateral movable edge that is able to slide along a rectilinear guide parallel to the advancing sense of the containers.

3. Device according to claim 1, wherein the second guide member is a second lateral guide edge that is able to slide along a rectilinear guide parallel to the advancing direction of the containers.

4. Method for removing containers to be treated from a conveyor line and for replacing treated containers on the conveyor line, the method being activatable by a device according to claim 1, the method including the following successive steps:

positioning the first guide member in a first service position, wherein the first guide member is able to laterally guide the containers along the conveyor line from the first lateral guide wall to a tangential area in which the rotating disc is tangential to the conveyor line, and positioning the second guide member in a second service position wherein the second guide member is able to laterally guide the containers along the conveyor line from the tangential area to the second lateral guide wall, the first guide member and the second guide member being mutually arranged to laterally guide the containers advancing along the conveyor line between the first lateral guide wall and the second lateral guide wall;

moving the second guide member towards the second advanced position to create a first lateral opening and laterally guide the containers that precede the first container to be treated and that advance along the conveyor line, the first lateral opening extending between the first guide member and the second lateral guide wall such as to allow at least one container to be treated to be transferred from the conveyor line to a respective seat of the rotating disc;

moving the first guide member towards the first advanced position to laterally guide the containers that follow a last container to be treated and that advance along the conveyor line between the first lateral guide wall and the second lateral guide wall;

concurrently moving the first guide member towards the first retracted position and the second guide member towards the second retracted position so as to laterally guide the containers that advance along the conveyor line between the first lateral guide wall and the second lateral guide wall;

moving the second guide member towards the second service position to create a second lateral opening and laterally guide containers that precede the first treated container to be transferred to the conveyor line and that advance along the conveyor line, the second lateral opening extending between the first lateral guide wall and the second guide member to allow at least one treated container to be transferred from a corresponding seat of the rotating disc again to the conveyor line;

moving the first guide member towards the first service position to laterally guide containers that follow a last treated container newly replaced on the conveyor line.

* * * * *